(12) United States Patent
Tsukamoto

(10) Patent No.: US 9,537,171 B2
(45) Date of Patent: Jan. 3, 2017

(54) FUEL CELL MODULE

(71) Applicant: HONDA MOTOR CO., LTD., Tokyo (JP)

(72) Inventor: Keiji Tsukamoto, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/694,353

(22) Filed: Apr. 23, 2015

(65) Prior Publication Data

US 2015/0364782 A1 Dec. 17, 2015

(30) Foreign Application Priority Data

Jun. 11, 2014 (JP) ................................ 2014-120378

(51) Int. Cl.
| | |
|---|---|
| *H01M 8/06* | (2016.01) |
| *H01M 8/04* | (2016.01) |
| *H01M 8/12* | (2016.01) |
| *C01B 3/38* | (2006.01) |

(52) U.S. Cl.
CPC ............ *H01M 8/2432* (2016.02); *C01B 3/382* (2013.01); *H01M 8/0618* (2013.01); *C01B 2203/0233* (2013.01); *C01B 2203/0261* (2013.01); *C01B 2203/066* (2013.01); *C01B 2203/1047* (2013.01); *C01B 2203/1064* (2013.01); *C01B 2203/1247* (2013.01); *C01B 2203/142* (2013.01); *H01M 2008/1293* (2013.01); *Y02E 60/50* (2013.01); *Y02E 60/525* (2013.01)

(58) Field of Classification Search
CPC ................. H01M 2008/1293; H01M 8/04022; H01M 8/0612; H01M 8/0618; H01M 8/0631; H01M 2008/1095; H01M 8/04067
See application file for complete search history.

(56) References Cited

U.S. PATENT DOCUMENTS

| | | | |
|---|---|---|---|
| 5,763,114 A * | 6/1998 | Khandkar | B01J 8/0085 429/423 |
| 6,077,620 A * | 6/2000 | Pettit | B01J 8/0438 429/425 |
| 2001/0049039 A1* | 12/2001 | Haltiner, Jr. | H01M 8/04022 429/440 |

(Continued)

FOREIGN PATENT DOCUMENTS

| | | |
|---|---|---|
| AT | 513911 | 8/2014 |
| JP | 2009-059658 | 3/2009 |

(Continued)

OTHER PUBLICATIONS

German Search Report dated Dec. 10, 2015 and English Translation, 16 pages.

*Primary Examiner* — Patrick Ryan
*Assistant Examiner* — Christopher Domone
(74) *Attorney, Agent, or Firm* — Rankin, Hill & Clark LLP

(57) ABSTRACT

A fuel cell module includes a fuel cell stack, a reformer, and an exhaust gas combustor. The fuel cell stack has an oxygen-containing exhaust gas channel and a fuel exhaust gas channel at one end in a stacking direction of fuel cells. An exhaust gas combustor connected to the oxygen-containing exhaust gas channel and the fuel exhaust gas channel are provided at the one end of the fuel cell stack in the stacking direction. A reformer is provided around the exhaust gas combustor.

8 Claims, 15 Drawing Sheets

(56) References Cited

U.S. PATENT DOCUMENTS

| | | | | |
|---|---|---|---|---|
| 2002/0006535 A1* | 1/2002 | Woods | ............. | F23D 11/443 |
| | | | | 429/411 |
| 2005/0089731 A1 | 4/2005 | Ogiwara et al. | | |
| 2008/0289180 A1 | 11/2008 | Brantley et al. | | |
| 2011/0076578 A1* | 3/2011 | Shigezumi | ........ | H01M 8/04268 |
| | | | | 429/423 |
| 2011/0143238 A1* | 6/2011 | Ogawa | ............. | H01M 8/2465 |
| | | | | 429/423 |
| 2012/0121995 A1* | 5/2012 | Grieve | ............. | H01M 8/0618 |
| | | | | 429/410 |

FOREIGN PATENT DOCUMENTS

| | | |
|---|---|---|
| JP | 2011-113934 | 6/2011 |
| JP | 2011-129280 | 6/2011 |
| WO | 2013/114776 | 8/2013 |

\* cited by examiner

FUEL CELL MODULE

CROSS-REFERENCE TO RELATED APPLICATION

This application is based upon and claims the benefit of priority from Japanese Patent Application No. 2014-120378 filed on Jun. 11, 2014, the contents of which are incorporated herein by reference.

BACKGROUND OF THE INVENTION

Field of the Invention

The present invention relates to a fuel cell module including a flat plate stack type fuel cell stack formed by stacking a plurality of flat plate type fuel cells for performing power generation by electrochemical reactions of a fuel gas and an oxygen-containing gas.

Description of the Related Art

In general, a solid oxide fuel cell (SOFC) employs a solid electrolyte. The solid electrolyte is an oxide ion conductor such as stabilized zirconia. The solid electrolyte is interposed between an anode and a cathode to form an electrolyte electrode assembly, for example, a membrane electrode assembly (MEA). The electrolyte electrode assembly is sandwiched between separators (bipolar plates). In use, generally, predetermined numbers of the electrolyte electrode assemblies and the separators are stacked together to form a fuel cell stack.

In the SOFC, since the operating temperature is relatively high, the stacked fuel cells need to be heated to the desired temperature beforehand. It is because, if a hot gas is supplied to fuel cells having a low temperature, cracks, etc. may occur in the fuel cells undesirably, due to the large temperature difference.

In this regard, for example, an indirect internal reforming type SOFC disclosed in Japanese Laid-Open Patent Publication No. 2009-059658 (hereinafter referred to as conventional technique 1) is known. In this indirect internal reforming type SOFC, as shown in FIG. 13, a reformer having a first reforming unit 1a and a second reforming unit 2a is provided. The first reforming unit 1a and the second reforming unit 2a are connected in series.

The indirect internal reforming type SOFC includes an SOFC 3a for performing power generation using a reformed gas obtained by a reformer. The SOFC 3a is placed in a casing 4a. The first reforming unit 1a and the second reforming unit 2a are parts of the casing 4a.

The SOFC 3a has a flame forming unit 5a. The frame forming unit 5a combusts an anode off gas to produce flames 6a. According to the disclosure, the second reforming unit 2a can utilize combustion heat from the flame forming unit 5a, and the first reforming unit 1a can utilize radiation heat from the SOFC 3a.

Further, a fuel cell module disclosed in Japanese Laid-Open Patent Publication No. 2011-129280 (hereinafter referred to as conventional technique 2) is known. As shown in FIG. 14, in this fuel cell module, a fuel stack 2b, a reformer 3b, and a manifold 4b are surrounded by a lower heat insulating member 5b and a side heat insulating member 6b. In this state, these components are placed in a casing 1b.

In the fuel cell stack 2b, a high temperature conductive member 7b is provided to contact a lateral end of each fuel cell. The heat conductivity of the high temperature conductive member 7b is higher than the heat conductivity of each fuel cell. Therefore, according to the disclosure, it is possible to suppress occurrence of non-uniform temperature distribution in the fuel cell stack 2b, in the stacking direction of the fuel cells and in the vertical direction.

Further, in a fuel cell system disclosed in Japanese Laid-Open Patent Publication No. 2011-113934 (hereinafter referred to as conventional technique 3), as shown in FIG. 15, a fuel cell 1c which performs power generation by supplied fuel gas and oxygen-containing gas is placed in a heat insulating container 2c. In the heat insulating container 2c, an exhaust gas channel 3c for discharging an exhaust gas discharged from the fuel cell 1c is provided.

An oxygen-containing gas heat exchanger 4c and a vaporizer 5c are provided in the exhaust gas channel 3c along a flow direction of the exhaust gas. Further, a burner 6c for heating at the time of starting operation of the fuel cell 1c or the like is provided between the oxygen-containing gas heat exchanger 4c and the vaporizer 5c. A raw material gas, i.e., a mixed gas of water vapor and a methane gas heated beforehand by the vaporizer 5c is supplied to a reformer 7c.

SUMMARY OF THE INVENTION

In the above conventional technique 1, the area of the flame forming unit 5a provided on an upper surface of the SOFC 3a is considerably large, and heat may not be transmitted efficiently to the second reforming unit 2a. Therefore, in this indirect internal reforming type SOFC, the performance of starting operation is poor, thermally self-sustaining operation is not facilitated, the heat efficiency is low, and the indirect internal reforming type SOFC cannot be provided in a compact space.

Further, since the first reforming unit 1a and the second reforming unit 2a are parts of the casing 4a, heat tends to be radiated from the surface of the casing 4a. Accordingly, the temperature in the first reforming unit 1a and the second reforming unit 2a may become non-uniform, and the reforming performance is degraded. Further, in some cases, the SOFC 3a in a form of stacked fuel cells tends to have non-uniform temperature distribution, and the SOFC 3a may be deteriorated easily.

Further, in the above conventional technique 2, a combustion unit 8b is provided above the fuel cell stack 2b. In the structure, the area of the combustion unit 8b becomes significantly large, and the heat is not transmitted efficiently to the reformer 3b. Therefore, in the fuel cell module, the performance of starting operation is poor, thermally self-sustaining operation is not facilitated, the heat efficiency is low, and the fuel cell module cannot be provided in a compact space.

Further, the temperature around the combustion unit 8b tends to be high, and the cell temperature around the manifold 4b tends to be low. Therefore, the power generation performance of the fuel cell stack 2b is low. Moreover, since the high temperature conductive member 7b is provided additionally, the fuel cell module has a large size and a large weight as a whole.

Further, in the conventional technique 3, the separate burner 6c is provided immediately below the fuel cell 1c. Therefore, the space in the heat insulating container 2c cannot be used efficiently. Further, in the exhaust gas channel 3c, the air is preheated by the oxygen-containing gas heat exchanger 4c beforehand. Therefore, heat shortage tends to occur in the reformer 7c which performs heat exchange with the exhaust gas, and the heat exchange performance is degraded.

The present invention has been made to solve these types of problems, and an object of the present invention is to provide a fuel cell module having compact structure in which improvement in the performance of starting operation and heat efficiency is achieved, and thermally self-sustaining operation is facilitated suitably.

A fuel cell module according to the present invention includes a flat plate stack type fuel cell stack, a reformer, and an exhaust gas combustor. The flat plate stack type fuel cell stack is formed by stacking a plurality of flat plate type fuel cells configured to perform power generation by electrochemical reactions of a fuel gas and an oxygen-containing gas. The reformer is configured to reform a raw fuel chiefly containing hydrocarbon to produce the fuel gas supplied to the fuel cell stack. The exhaust gas combustor is configured to combust the fuel gas discharged from the fuel cell stack as a fuel exhaust gas and the oxygen-containing gas discharged from the fuel cell stack as an oxygen-containing exhaust gas to produce a combustion gas, and configured to supply the combustion gas to the reformer.

The fuel cell stack has an exhaust gas outlet configured to discharge the fuel exhaust gas and the oxygen-containing exhaust gas at one end in a stacking direction of the fuel cells, and the exhaust gas combustor connected to the exhaust gas outlet is provided at the one end of the fuel cell stack in the stacking direction. The reformer is provided around the exhaust gas combustor.

In the present invention, the reformer is provided around the exhaust gas combustor. In the structure, quantity of heat produced in the exhaust gas combustor is supplied efficiently to the reformer around the exhaust gas combustor. Thus, with the compact structure, improvement in the performance of starting operation and heat efficiency is achieved, and thermally self-sustaining operation is facilitated suitably. Thermally self-sustaining operation herein means operation where the operating temperature of the fuel cell is maintained using only heat energy generated in the fuel cell, without supplying additional heat from the outside.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
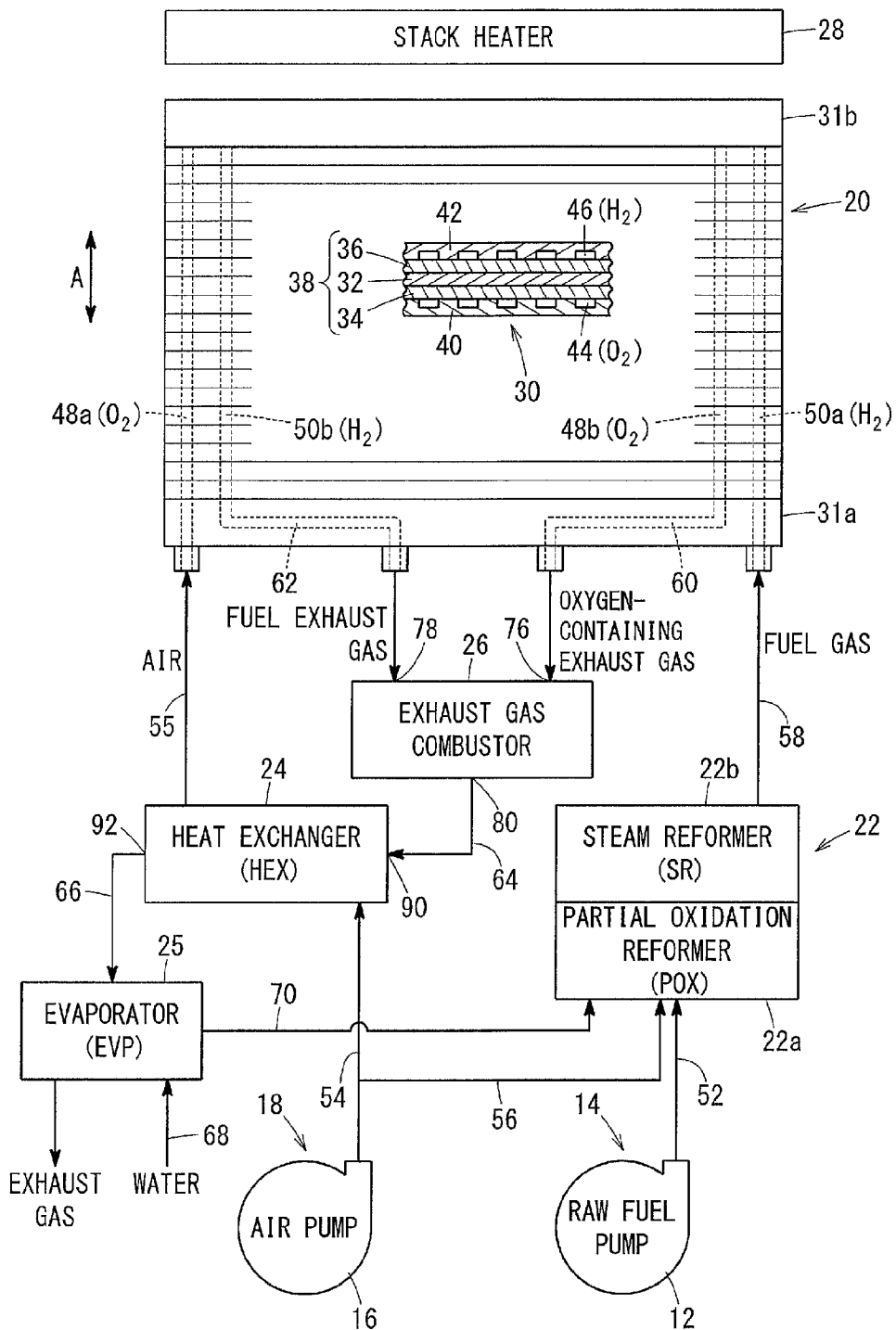
FIG. 1 is a diagram schematically showing structure of a fuel cell module according to a first embodiment of the present invention.

A fuel cell module 10 according to a first embodiment of the present invention shown in FIG. 1 may be used in a stationary application. Additionally, the fuel cell module 10 may be used in various applications. For example, the fuel cell module 10 may be mounted in a vehicle. A raw fuel supply apparatus 14 (including a raw fuel pump 12) for supplying a raw fuel (such as city gas) and an oxygen-containing gas supply apparatus 18 (including an air pump 16) for supplying an oxygen-containing gas are connected to the fuel cell module 10.

The fuel cell module 10 includes a flat plate stack type fuel cell stack 20, a reformer 22, a heat exchanger (HEX) 24, an evaporator (EVP) 25, an exhaust gas combustor 26 and a stack heater 28. The fuel cell stack 20 includes flat plate type solid oxide fuel cells 30 for performing power generation by electrochemical reactions of a fuel gas (gas formed by mixing a hydrogen gas with methane, carbon monoxide) and an oxygen-containing gas (air). The fuel cells 30 are stacked in vertical directions indicated by an arrow A (or in a horizontal direction), and end plates 31a, 31b are provided at both ends of the fuel cells 30 in the stacking direction (hereinafter simply referred to as the stacking direction).

For example, each of the fuel cells 30 includes an electrolyte electrode assembly (MEA) 38. The electrolyte electrode assembly 38 includes a cathode 34, an anode 36, and an electrolyte 32 interposed between the cathode 34 and the anode 36. The electrolyte 32 is an ion oxide conductor made of, e.g., stabilized zirconia.

A cathode side separator 40 and an anode side separator 42 are provided on both sides of the electrolyte electrode assembly 38. The cathode side separator 40 has an oxygen-containing gas flow field 44 for supplying an oxygen-containing gas to the cathode 34, and the anode side separator 42 has a fuel gas flow field 46 for supplying a fuel gas to the anode 36. As the fuel cell 30, various types of conventional SOFCs can be adopted.

The operating temperature of the fuel cell 30 is high, at several hundred ° C. Methane in the fuel gas is reformed at the anode 36 to produce hydrogen and CO, and the hydrogen and CO are supplied to a portion of the electrolyte 32 adjacent to the anode 36.

The fuel cell stack 20 has an oxygen-containing gas supply passage 48a integrally connected to an inlet side of each oxygen-containing gas flow field 44, and an oxygen-containing gas discharge passage 48b is integrally connected to an outlet side of each oxygen-containing gas flow field 44. The oxygen-containing gas supply passage 48a and the oxygen-containing gas discharge passage 48b extend through the fuel cell stack 20 in the stacking directions indicated by the arrow A.

Further, the fuel cell stack 20 has an fuel gas supply passage 50a integrally connected to an inlet side of each fuel gas flow field 46, and a fuel gas discharge passage 50b integrally connected to an outlet side of each fuel gas flow field 46. The fuel gas supply passage 50a and the fuel gas discharge passage 50b extend through the fuel cell stack 20 in the stacking direction indicated by the arrow A.

In general, the reformer 22 reforms a raw fuel chiefly containing hydrocarbon to produce a fuel gas supplied to the fuel cell stack 20. In the first embodiment, the reformer 22 includes a partial oxidation reformer (POX) 22a and a steam reformer (SR) 22b, and the partial oxidation reformer 22a and the steam reformer 22b are connected in series.

The partial oxidation reformer 22a reforms the raw fuel by partial oxidation reaction of the raw fuel chiefly containing hydrocarbon (e.g., city gas) and the oxygen-containing gas to produce the fuel gas supplied to the fuel cell stack 20.

Specifically, the partial oxidation reformer 22a is a preliminary reformer for reforming higher hydrocarbon ($C_{2+}$) such as ethane ($C_2H_6$), propane ($C_3H_8$), and butane ($C_4H_{10}$) in the raw fuel to produce the fuel gas chiefly containing hydrogen and CO by partial oxidation reforming. The operating temperature of the partial oxidation reformer 22a is in a range of about 500° C. and 1000° C. The partial oxidation reformer 22a uses at least one catalytic metal selected from Pt (platinum), Rh (rhodium), and Pd (palladium).

The steam reformer 22b reforms a mixed gas of a raw fuel and water vapor to produce a fuel gas supplied to the fuel cell stack 20. The steam reformer 22b uses at least one catalytic metal selected from Ru (ruthenium), Ni, (nickel), Pt (platinum), Rh (rhodium), Pd (palladium), Ir (iridium), and Fe (iron).

The heat exchanger 24 increases the temperature of the oxygen-containing gas by heat exchange with the combustion gas, and supplies the oxygen-containing gas to the fuel cell stack 20. The exhaust gas combustor 26 combusts the fuel gas discharged from the fuel cell stack 20 as a fuel exhaust gas and the oxygen-containing gas discharged from the fuel cell stack 20 as an oxygen-containing exhaust gas to produce the combustion gas, and supplies the combustion gas to the heat exchanger 24.

The evaporator 25 evaporates water to produce water vapor, and supplies the water vapor to the steam reformer 22b. The evaporator 25 is provided at one end of the fuel cell stack 20 in the stacking direction (adjacent to the end plate 31a), downstream of the heat exchanger 24 in the flow direction of the combustion gas. The stack heater 28 has a function of increasing the temperature, decreasing the temperature, or maintaining the temperature of the fuel cell stack 20. For example, a ceramic heater or a combustion burner is used as the stack heater 28.

The reformer (partial oxidation reformer 22a and steam reformer 22b) 22, the heat exchanger 24, the evaporator 25, and the exhaust gas combustor 26 are provided at one end of the fuel cell stack 20 in the stacking direction (adjacent to the end plate 31a). The stack heater 28 is provided at the other end of the fuel cell stack 20 in the stacking direction (adjacent to the end plate 31b).

The raw fuel supply apparatus 14 has a raw fuel channel 52 for supplying the raw fuel to the partial oxidation reformer 22a. The oxygen-containing gas supply apparatus 18 has an oxygen-containing gas channel 54 for supplying an oxygen-containing gas to the heat exchanger 24, and an oxygen-containing gas supply channel 55 for supplying the oxygen-containing gas which has been subjected to heat exchange at the heat exchanger 24 to the oxygen-containing gas supply passage 48a of the fuel cell stack 20. An oxygen-containing gas branch channel 56 branched from the oxygen-containing gas channel 54 is connected to a position somewhere in the raw fuel channel 52, and a mixed gas of the raw fuel and the oxygen-containing gas is supplied to the partial oxidation reformer 22a.

A fuel gas channel 58 is connected to the partial oxidation reformer 22a. The fuel gas which has been subjected to partial oxidation reforming is supplied to the fuel gas supply passage 50a of the fuel cell stack 20 through the fuel gas channel 58. The partial oxidation reformer 22a and the steam reformer 22b are connected to the fuel gas channel 58 in series. Specifically, the partial oxidation reformer 22a is provided upstream of the steam reformer 22b in the flow direction of the fuel gas (raw fuel).

An oxygen-containing exhaust gas channel (exhaust gas outlet) 60 is connected to the oxygen-containing gas discharge passage 48b of the fuel cell stack 20. The oxygen-containing exhaust gas discharged from the fuel cell stack 20 flows through the oxygen-containing exhaust gas channel 60 into the exhaust gas combustor 26. A fuel exhaust gas channel (exhaust gas outlet) 62 is connected to the fuel gas discharge passage 50b of the fuel cell stack 20. The fuel exhaust gas discharged from the fuel cell stack 20 flows through the fuel exhaust gas channel 62 into the exhaust gas combustor 26.

On one end of a combustion gas channel 64 is connected to the outlet of the exhaust gas combustor 26, and the other end of the combustion gas channel 64 is connected to the heat exchanger 24. An exhaust gas channel 66 is connected to the outlet of the heat exchanger 24. The combustion gas (exhaust gas) used in heat exchange with the oxygen-containing gas is discharged through the exhaust gas channel 66. The evaporator 25 is provided at a position somewhere in the exhaust gas channel 66.

A water supply channel 68 is connected to the inlet of the evaporator 25, and one end of a water vapor channel 70 is connected to the outlet of the evaporator 25. The other end of the water vapor channel 70 is connected to the steam reformer 22b through the partial oxidation reformer 22a.

Figure 2:
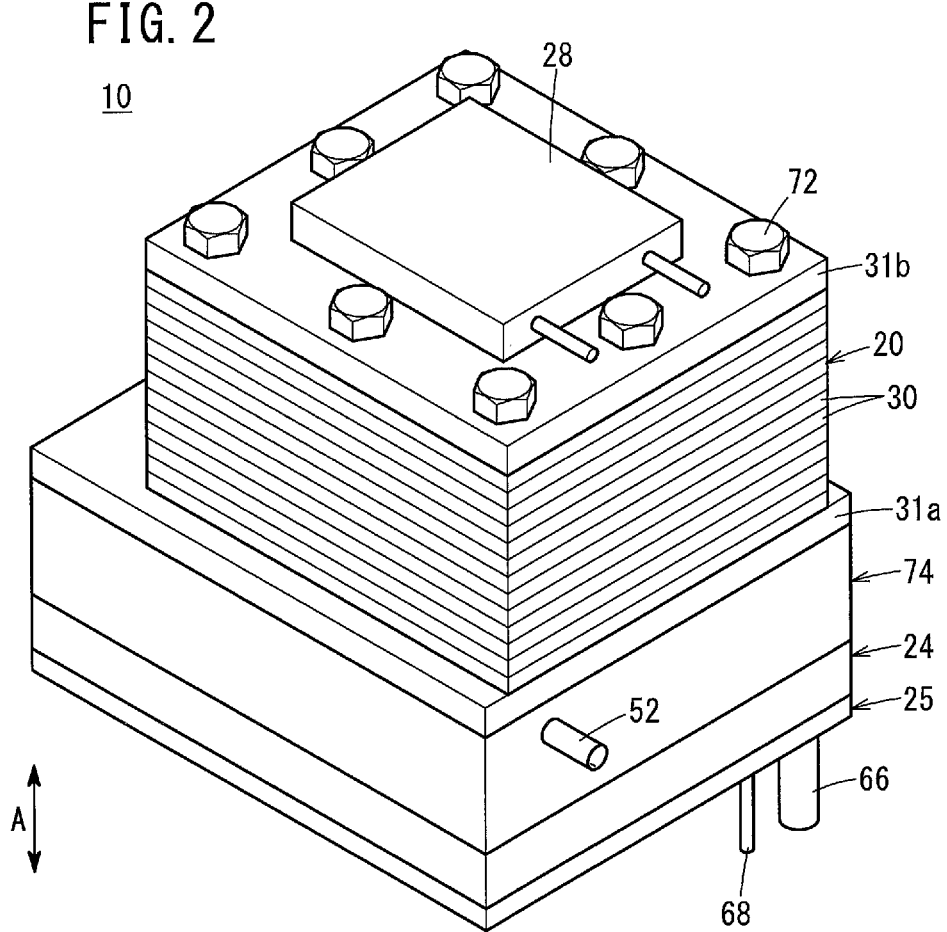
FIG. 2 is a perspective view showing the fuel cell module.
Figure 3:
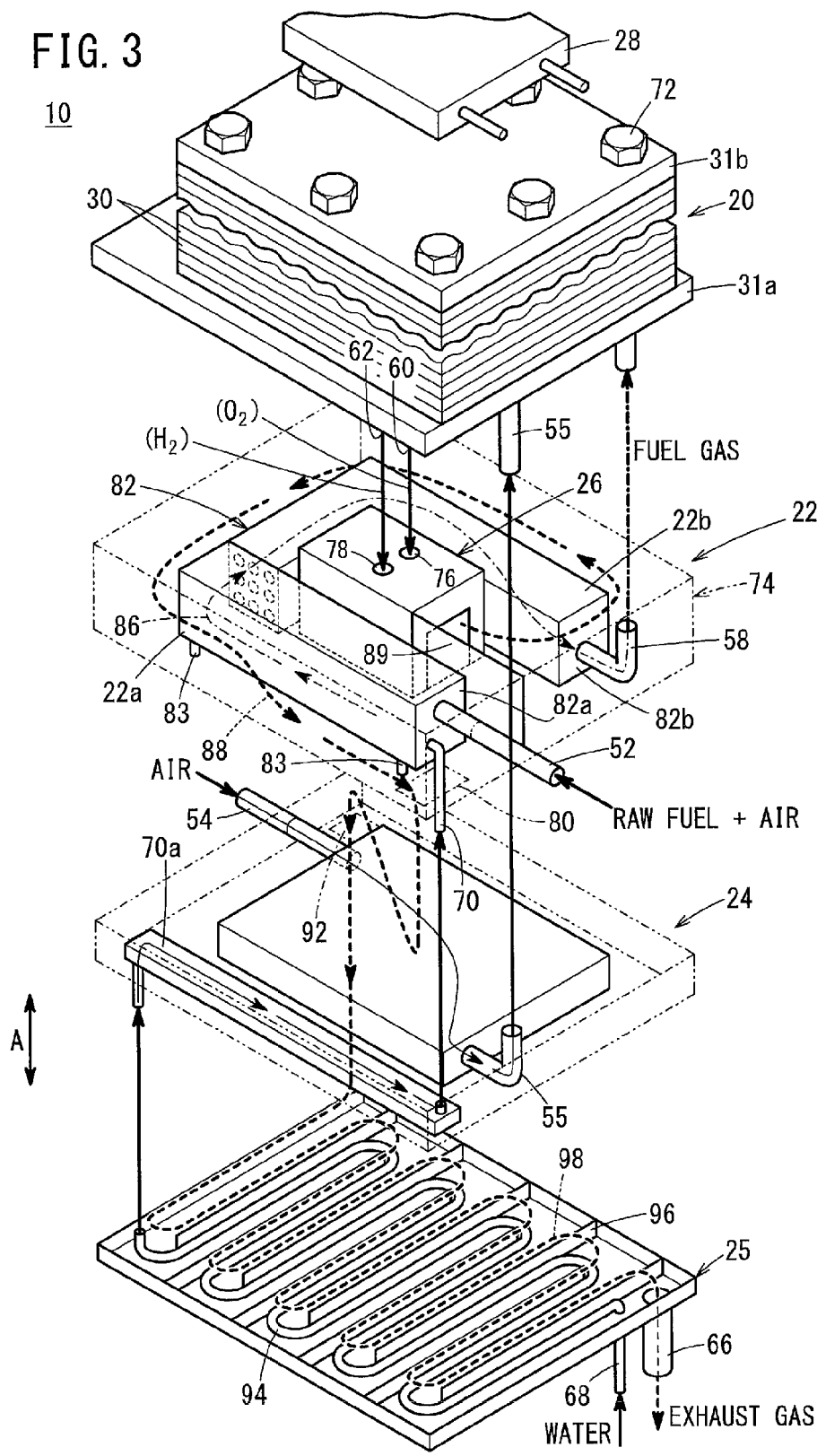
FIG. 3 is an exploded perspective view showing main components of the fuel cell module.

As shown in FIGS. 2 and 3, in the fuel cell stack 20, components between the end plates 31a, 31b are fixed using a plurality of set screws 72, and the desired tightening load is applied to the fuel cell stack 20 in the stacking direction. The stack heater 28 is directly fixed to the end plate 31b. A casing 74, the heat exchanger 24, and the evaporator 25 are stacked together, and fixed to the end plate 31a. The heat exchanger 24 is positioned below the casing 74, and the evaporator 25 is positioned below the heat exchanger 24.

Figure 4:
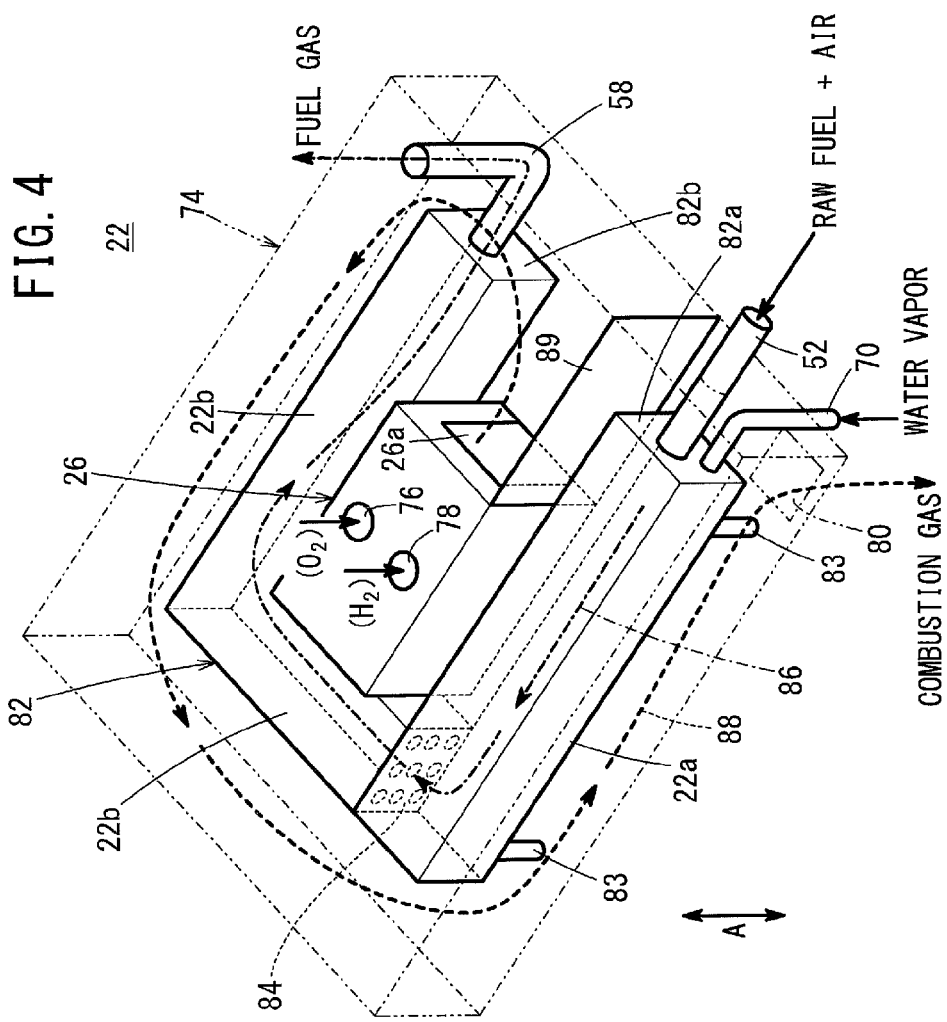
FIG. 4 is a perspective view showing a reformer and an exhaust gas combustor of the fuel cell module.

As shown in FIGS. 3 and 4, the casing 74 has a rectangular shape, and the outer size of the casing 74 is approximated to the outer size of the end plate 31a. The outer size of the casing 74 is substantially the same as, or the same or less than the outer size of the end plate 31a. An oxygen-containing exhaust gas window 76 connected to the oxygen-containing exhaust gas channel 60 and a fuel exhaust gas window 78 connected to the fuel exhaust gas channel 62 are both formed on the upper surface of the casing 74 and the upper surface of the exhaust gas combustor 26. An exhaust gas connection window 80 is formed at a corner on the lower surface of the casing 74 (lower position at an end 82a of a rectangular cylindrical casing 82 described later).

The exhaust gas combustor 26 is provided at substantially the center in the casing 74. The exhaust gas combustor 26 is connected to the oxygen-containing exhaust gas window 76 and the fuel exhaust gas window 78. The exhaust gas combustor 26 has a rectangular shape, and a heater (not shown) is provided as necessary. An opening 26a is provided at one end (on a side closer to ends 82a, 82b of a rectangular cylindrical casing 82 described later) of the exhaust gas combustor 26.

The reformer 22 is provided in the casing 74, around the exhaust gas combustor 26. The reformer 22 has a rectangular cylindrical casing 82, e.g., having a U-shape as a whole. Legs 83 are provided at respective corners of the rectangular cylindrical casing 82 so that the rectangular cylindrical casing 82 can be spaced from the bottom surface of the casing 74. This is aimed to expose surfaces of the rectangular cylindrical casing 82 to the exhaust gas.

The raw fuel channel 52 and the water vapor channel 70 are connected to the one end 82a of the rectangular cylindrical casing 82, and the fuel gas channel 58 is connected to the other end 82b of the rectangular cylindrical casing 82. In the rectangular cylindrical casing 82, the partial oxidation reformer 22a is provided in a straight section on a side closer to the end 82a, and the steam reformer 22b is provided in an L-shaped section on a side closer to the end 82b through a partition plate 84.

Catalytic metal (reforming catalyst) fills the reformer 22, and the reformer 22 has a raw fuel flow channel 86 as a passage of the raw fuel. The raw fuel flow channel 86 has a substantially U-shape, and the raw fuel flow channel 86 is connected to the raw fuel channel 52 and the fuel gas channel 58. A combustion gas flow channel 88 is provided in an outer area of the reformer 22. The combustion gas flow channel 88 is connected to the exhaust gas combustor 26 and the exhaust gas connection window 80. The combustion gas flows through the combustion gas flow channel 88 along the outer area of the reformer 22. The combustion gas flow channel 88 extends from the opening 26a of the exhaust gas combustor 26 to the exhaust gas connection window 80. A partition plate 89 is provided at the end 82a of the rectangular cylindrical casing 82. The partition plate 89 isolates the opening 26a from the exhaust gas connection window 80 that are adjacent to each other.

The raw fuel flow channel 86 and the combustion gas flow channel 88 are provided adjacent to, and in parallel to each other. The raw fuel in the raw fuel flow channel 86 and the fuel gas in the combustion gas flow channel 88 flow in a counterflow manner relative to each other.

As shown in FIG. 3, the heat exchanger 24 has a rectangular shape, and the outer size of the heat exchanger 24 is approximated to the outer size of the end plate 31a. The outer size of the heat exchanger 24 is substantially the same as, or the same or less than the outer size of the end plate 31a. The exhaust gas connection window 80 is provided at one corner on an upper part of the heat exchanger 24. An exhaust gas connection window 92 is provided at a corner on a lower surface of the heat exchanger 24, diagonally opposite to the exhaust gas connection window 80.

The exhaust gas connection windows 80, 92 allow the combustion gas to flow along a diagonal line of the heat exchanger 24. The heat exchanger 24 has a steam producing section 70a connected to the water vapor channel 70. The steam producing section 70a extends in a long side direction of the heat exchanger 24.

The evaporator 25 has a thin rectangular plate shape, and the outer size of the evaporator 25 is approximated to the outer size of the end plate 31a. The outer size of the evaporator 25 is substantially the same as, or the same or less than the outer size of the end plate 31a. A pipe member 94 extending in a serpentine pattern is provided for the evaporator 25. An inlet end of the pipe member 94 is connected to the water supply channel 68, and an outlet end of the pipe member 94 is connected to the steam producing section 70a. A plurality of partition plates 96 are provided along the serpentine pipe member 94 in a zigzag pattern in correspondence with the shape of the pipe member 94. The partition plates 96 form an exhaust gas serpentine channel 98.

Next, operation of this fuel cell module 10 will be described below.

At the time of starting operation of the fuel cell module 10, as shown in FIG. 1, in the oxygen-containing gas supply apparatus 18, by operation of the air pump 16, the air is supplied to the oxygen-containing gas channel 54. Some of the air flows into the oxygen-containing gas branch channel 56, and the air is supplied to the partial oxidation reformer 22a. The remaining air is supplied to the heat exchanger 24.

In the meanwhile, in the raw fuel supply apparatus 14, by operation of the fuel gas pump 12, a raw fuel such as the city gas (containing $CH_4$, $C_2H_6$, $C_3H_8$, $C_4H_{10}$) is supplied to the raw fuel channel 52. The raw fuel is supplied into the partial oxidation reformer 22a. Therefore, the mixed gas of the raw fuel and the air is supplied into the partial oxidation reformer 22a, and the mixed gas is ignited to start partial oxidation reforming.

For example, if $O_2/C=0.5$, partial oxidation reaction ($2CH_4+O_2 \rightarrow 4H_2+2CO$) is induced. This partial oxidation reaction is exothermic reaction. A reducing gas (fuel gas) at high temperature (about 500° C. to 1000° C.) is produced from the partial oxidation reformer 22a.

The hot reducing gas heats the steam reformer 22b, and the reducing gas is supplied to the fuel gas supply passage 50a of the fuel cell stack 20 through the fuel gas channel 58. In the fuel cell stack 20, after the hot reducing gas flows through each fuel gas flow field 46, the reducing gas is discharged from the fuel gas discharge passage 50b to the fuel exhaust gas channel 62. The reducing gas flows into the exhaust gas combustor 26 connected to the fuel exhaust gas channel 62.

As described later, the air (oxygen-containing gas) is supplied to the exhaust gas combustor 26. The air and the reducing gas are self-ignited, or ignited by ignition means (not shown), and combusted. A shown in FIG. 4, the combustion gas produced in the exhaust gas combustor 26 flows through the combustion gas flow channel 88, and flows along the outer area of the reformer 22. Then, the combustion gas is supplied to the heat exchanger 24 through the exhaust gas connection window 80. As shown in FIG. 3, in the heat exchanger 24, the supplied air is heated by the combustion gas. The combustion gas flows through the exhaust gas connection window 92 into the evaporator 25. After the combustion gas moves along the exhaust gas serpentine channel 98, the combustion gas is discharged from the exhaust gas channel 66.

As shown in FIG. 1, the heated air flows through the oxygen-containing gas supply channel 55, and the air is supplied to the oxygen-containing gas supply passage 48a of the fuel cell stack 20. After the air flows through the oxygen-containing gas flow field 44, the air is discharged from the oxygen-containing gas discharge passage 48b to the oxygen-containing exhaust gas channel 60. Further, the air flows into the exhaust gas combustor 26, and the air is used for the combustion process. Therefore, in the exhaust gas combustor 26, by combustion, the fuel cell stack 20 is heated by heat radiated or transmitted from the end plate 31*a*, and the reformer 22 is heated.

At the same time as starting operation of the above oxygen-containing gas supply apparatus 18 and the raw fuel supply apparatus 14, operation of the stack heater 28 is started. Therefore, the fuel cell stack 20 is also heated from the end plate 31*b*.

In this regard, the evaporator 25, the fuel cell stack 20, and the steam reformer 22*b* are heated to the water condensation temperature or more, and the water is supplied to the evaporator 25. Therefore, in the evaporator 25, as shown in FIG. 3, the water flows along the pipe member 94, and the exhaust gas flows along the exhaust gas serpentine channel 98 to produce the water vapor. This water vapor is sent from the partial oxidation reformer 22*a* to the steam reformer 22*b* through the water vapor channel 70.

In the partial oxidation reformer 22*a* and the steam reformer 22*b*, supply of the air is stopped, and the mixed gas of the raw fuel and water vapor is produced. The mixed gas is used for steam reforming within the partial oxidation reformer 22*a* and the steam reformer 22*b*. Hydrocarbon of $C_{2+}$ is removed (reformed) to produce a reformed gas chiefly containing methane. The reformed gas is supplied to the fuel cell stack 20 as a heated fuel gas. During power generation, the fuel gas reformed by the partial oxidation reformer 22*a* and the steam reformer 22*b* is supplied to the fuel cell stack 20 for generating electricity by chemical reactions with the air.

During power generation of the fuel cell stack 20, at the same time as the above operation, the air flows through the oxygen-containing gas flow field 44, and the fuel gas flows through the fuel gas flow field 46 (see FIG. 1). In each fuel cell 30, the air is supplied to the cathode 34, and the fuel gas is supplied to the anode 36 for generating electricity by chemical reactions.

In the first embodiment, as shown in FIG. 4, the reformer 22 is provided around the exhaust gas combustor 26. Thus, quantity of heat produced in the exhaust gas combustor 26 is supplied efficiently to the reformer 22 around the exhaust gas combustor 26. Thus, with the compact structure, improvement in the performance of starting operation and heat efficiency is achieved, and thermally self-sustaining operation is facilitated suitably. Thermally self-sustaining operation herein means operation where the operating temperature of the fuel cell 30 is maintained using only heat energy generated in the fuel cell 30, without supplying additional heat from the outside.

Further, the catalytic metal fills the reformer 22, and the reformer 22 has the raw fuel flow channel 86 as a passage of the raw fuel. In this regard, the combustion gas flow channel 88 is provided in the outer area of the reformer 22. The combustion gas flow channel 88 is connected to the exhaust gas combustor 26. The combustion gas flows through the combustion gas flow channel 88 along the outer area of the reformer 22. The raw fuel flow channel 86 and the combustion gas flow channel 88 are provided adjacent to, and in parallel to each other. In the structure, the raw fuel can suitably receive quantity of heat of the combustion gas. With the compact structure, improvement in the performance of starting operation and heat efficiency is achieved, and thermally self-sustaining operation is facilitated suitably.

Figure 5:
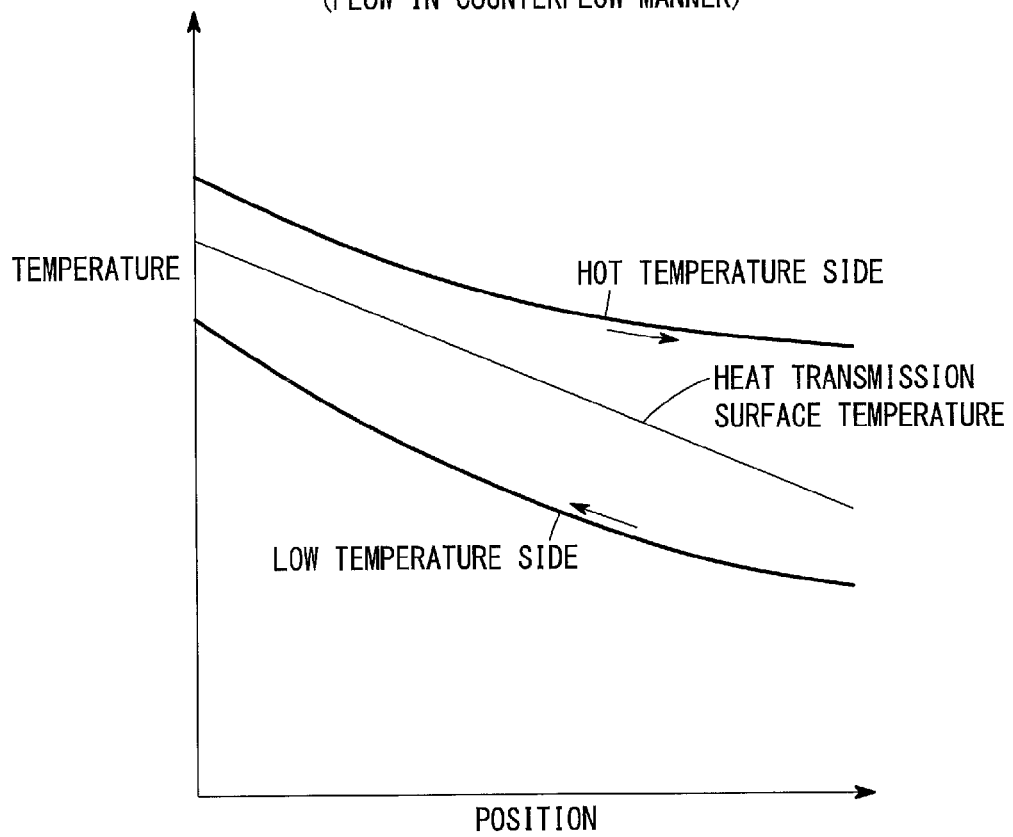
FIG. 5 is a graph showing the relationship in the heat transmission surface temperature when gases flow in a counterflow manner.

Further, the raw fuel in the raw fuel flow channel 86 and the combustion gas in the combustion gas flow channel 88 flow in a counterflow manner relative to each other. In the structure, as shown in FIG. 5, improvement in the efficiency of the heat exchange between the raw fuel and the combustion gas is achieved, and it becomes possible for the raw fuel to efficiently receive the quantity of heat of the combustion gas.

Moreover, the reformer 22 has the partial oxidation reformer 22*a* for reforming the raw fuel by partial oxidation reaction of the raw fuel and the oxygen-containing gas, and producing the fuel gas supplied to the fuel cell stack 20. Further, the reformer 22 has the steam reformer 22*b* for reforming the mixed gas of the raw fuel and the water vapor, and producing the fuel gas supplied to the fuel cell stack 20. The partial oxidation reformer 22*a* and the steam reformer 22*b* are connected in series.

Therefore, at the time of starting operation, increase in the temperature of the fuel cell stack 20 is facilitated by the partial oxidation reformer 22*a*, and improvement in the performance of starting operation is achieved. Further, during power generation, in the presence of the steam reformer 22*b*, excellent reforming efficiency is facilitated, and improvement in the power generation efficiency and heat efficiency is achieved suitably.

Further, in the fuel gas channel 58 for supplying the fuel gas to the fuel cell stack 20, the partial oxidation reformer 22*a* is provided upstream of the steam reformer 22*b* in the flow direction of the fuel gas. Therefore, in the presence of the partial oxidation reformer 22*a*, at the time of starting operation, increase in the temperature of the fuel cell stack 20 and the steam reformer 22*b* is facilitated, and improvement in the performance of starting operation is achieved. Further, during power generation, in the presence of the steam reformer 22*b*, excellent reforming efficiency is facilitated, and improvement in the power generation efficiency and the thermal efficiency is achieved suitably.

Further, the partial oxidation reformer 22*a* induces exothermic reaction, and the steam reformer 22*b* induces endothermic reaction. Accordingly, when the temperature of the steam reformer 22*b* is decreased, it becomes possible to supply the heat energy from the partial oxidation reformer 22*a*.

Further, as shown in FIGS. 2 and 3, the fuel cell module 10 has the heat exchanger 24 for increasing the temperature of the oxygen-containing gas by heat exchange with the combustion gas, and supplying the oxygen-containing gas to the fuel cell stack 20. The heat exchanger 24 is provided opposite to the fuel cell stack 20 such that the reformer 22 is provided between the heat exchanger 24 and the fuel cell stack 20. In the structure, the oxygen-containing gas can suitably receive quantity of heat of the combustion gas. With the compact structure, improvement in the performance of starting operation and heat efficiency is achieved, and thermally self-sustaining operation is facilitated suitably.

Further, the fuel cell module 10 has the evaporator 25 for evaporating water to produce water vapor, and supplying the water vapor to the steam reformer 22*b*. The evaporator 25 is provided at one end of the fuel cell stack 20 in the stacking direction, in the exhaust gas channel 66 for discharging the combustion gas from the heat exchanger 24. In the structure, in the evaporator 25, the water can efficiently receive quantity of heat of the combustion gas. With the compact structure, improvement in the performance of starting operation and heat efficiency is achieved, and thermally self-sustaining operation is facilitated suitably.

Further, the fuel cell module 10 is a solid oxide fuel cell module. Therefore, the fuel cell module 10 is optimally applicable to high temperature type fuel cells such as SOFC.

Figure 6:
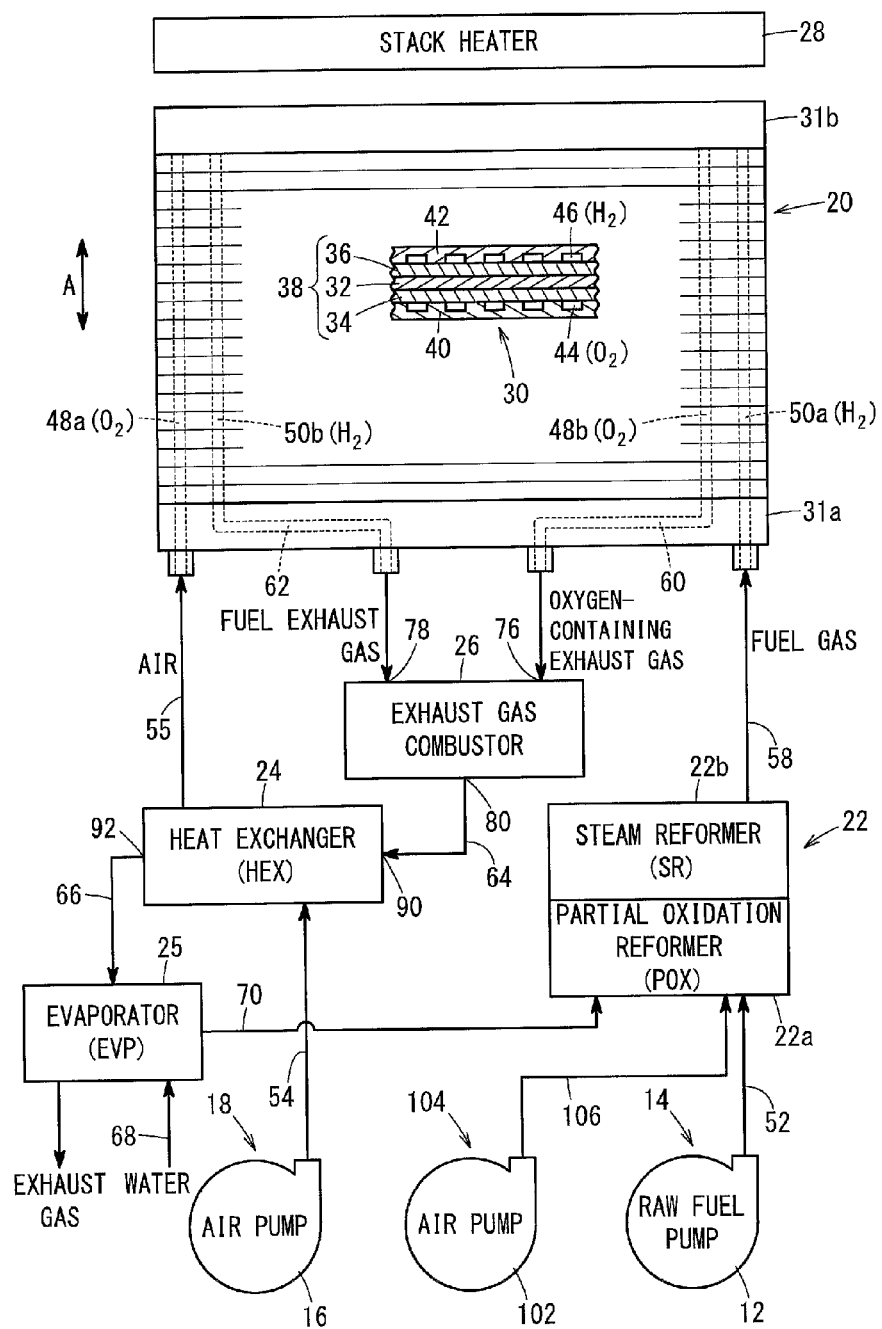
FIG. 6 is a diagram schematically showing structure of a fuel cell module according to a second embodiment of the present invention.

FIG. 6 is a diagram schematically showing a fuel cell module 100 according to a second embodiment of the present invention. The constituent elements that are identical to those of the fuel cell module 10 according to the first embodiment are labeled with the same reference numerals and detailed description thereof will be omitted. Also in third and the subsequent embodiments described later, the constituent elements that are identical to those of the fuel cell module 10 according to the first embodiment are labeled with the same reference numerals and detailed description thereof will be omitted.

The fuel cell module 100 has an oxygen-containing gas supply apparatus 104 (including an air pump 102, hereinafter referred to as the partial oxidation reforming oxygen-containing gas supply apparatus 104) for supplying air to the partial oxidation reformer 22a. The partial oxidation reforming oxygen-containing gas supply apparatus 104 includes a partial oxidation reforming oxygen-containing gas channel 106 for supplying air to the partial oxidation reformer 22a.

In the second embodiment, the oxygen-containing gas supply apparatus 18 supplying the oxygen-containing gas to the fuel cell stack 20, and the partial oxidation reforming oxygen-containing gas supply apparatus 104 for supplying air as the oxygen-containing gas to the partial oxidation reformer 22a are provided separately. Thus, in the second embodiment, the same advantages as in the case of the first embodiment are obtained.

Figure 7:
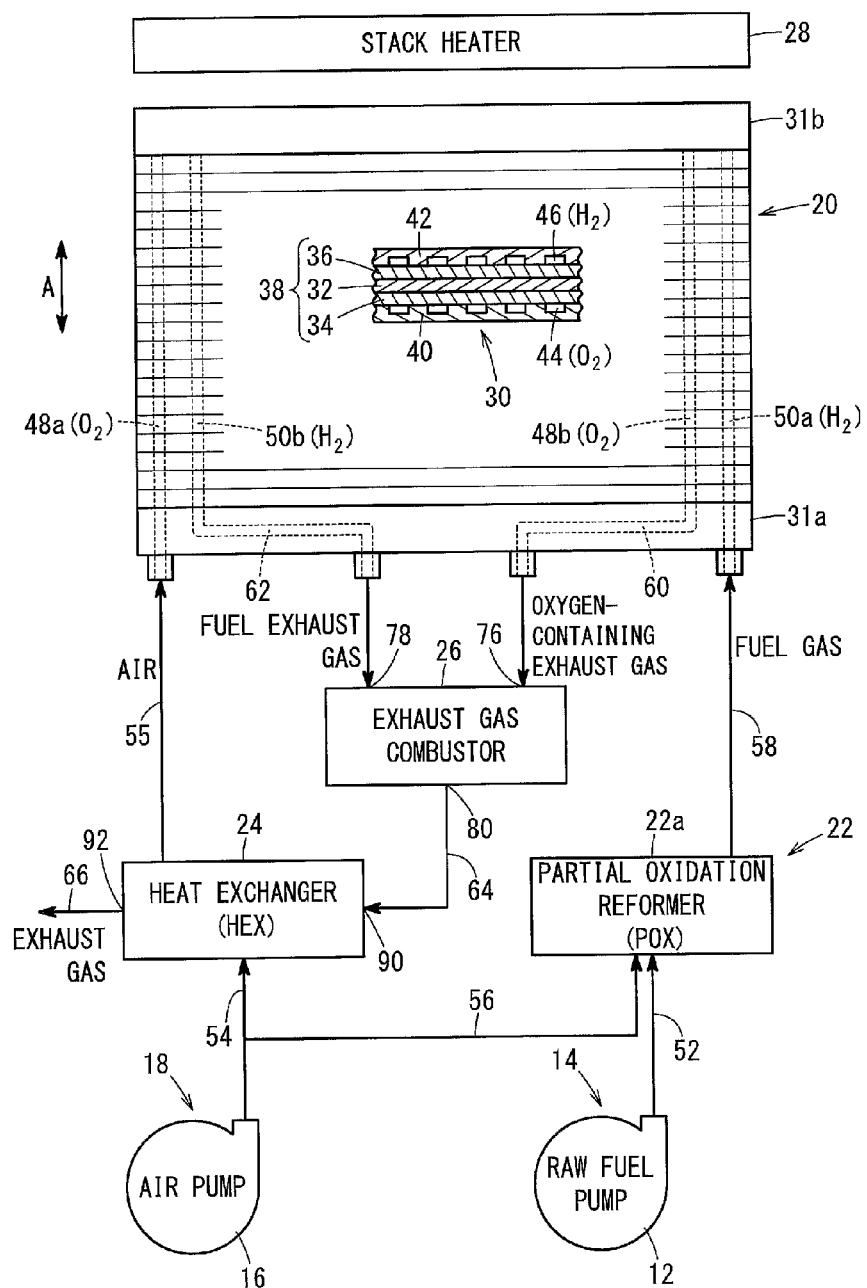
FIG. 7 is a diagram schematically showing structure of a fuel cell module according to a third embodiment of the present invention.

FIG. 7 is a diagram schematically showing a fuel cell module 110 according to a third embodiment of the present invention.

The fuel cell module 110 includes a fuel cell stack 20, a reformer 22, a heat exchanger 24, an exhaust gas combustor 26, and a stack heater 28. The reformer 22 only has a partial oxidation reformer 22a, without requiring any evaporator 25. The partial oxidation reformer 22a is provided over the entire area of a rectangular cylindrical casing 82 having a substantially U-shape (see FIGS. 3 and 4).

At the time of starting operation, the fuel cell module 110 is operated in the same manner as the above fuel cell module 10. Further, when it is determined that the temperature of the fuel cell stack 20 is increased to a desired operation start temperature and the reforming state of the partial oxidation reformer 22a is suitable, power generation by the fuel cell stack 20 is started. In the same manner as the time of starting operation described above, air flows through the oxygen-containing gas flow field 44, and the fuel gas flows through the fuel gas flow field 46. Thus, in each fuel cell 30, the air is supplied to the cathode 34 and the fuel gas is supplied to the anode 36 for generating electricity by chemical reactions.

As described above, in the third embodiment, the partial oxidation reformer 22a is provided around the exhaust gas combustor 26. Thus, in the third embodiment, with the compact structure, the same advantages as in the cases of the first and second embodiments are obtained. For example, improvement in the performance of starting operation and the heat efficiency is achieved, and thermally self-sustaining operation is facilitated suitably.

Figure 8:
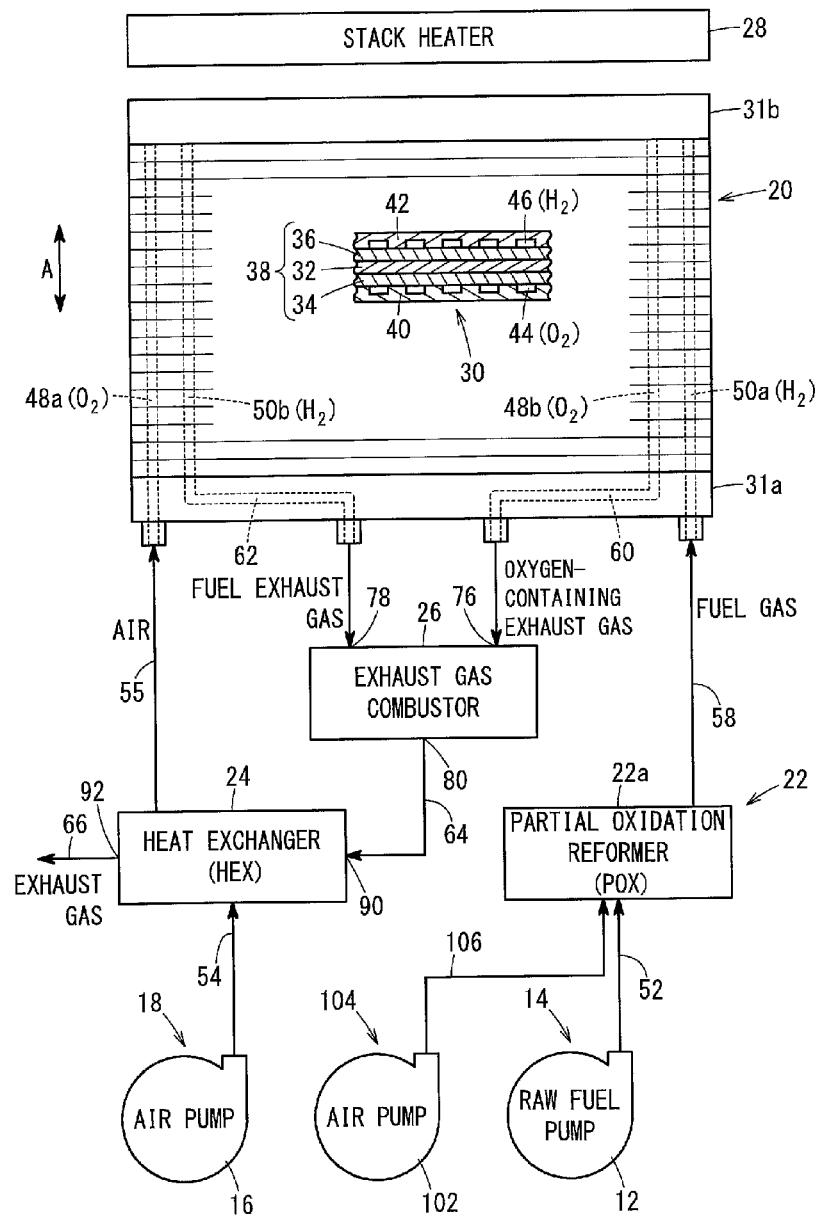
FIG. 8 is a diagram schematically showing structure of a fuel cell module according to a fourth embodiment of the present invention.

FIG. 8 is a diagram schematically showing a fuel cell module 120 according to a fourth embodiment of the present invention. In the fourth embodiment, the constituent elements that are identical to those of the second and third embodiments are labeled with the same reference numerals and detailed description thereof will be omitted.

The fuel cell module 120 has the oxygen-containing gas supply apparatus 18 and the partial oxidation reforming oxygen-containing gas supply apparatus 104 separately. Thus, in the fourth embodiment, the same advantages as in the cases of the first to third embodiments are obtained.

Figure 9:
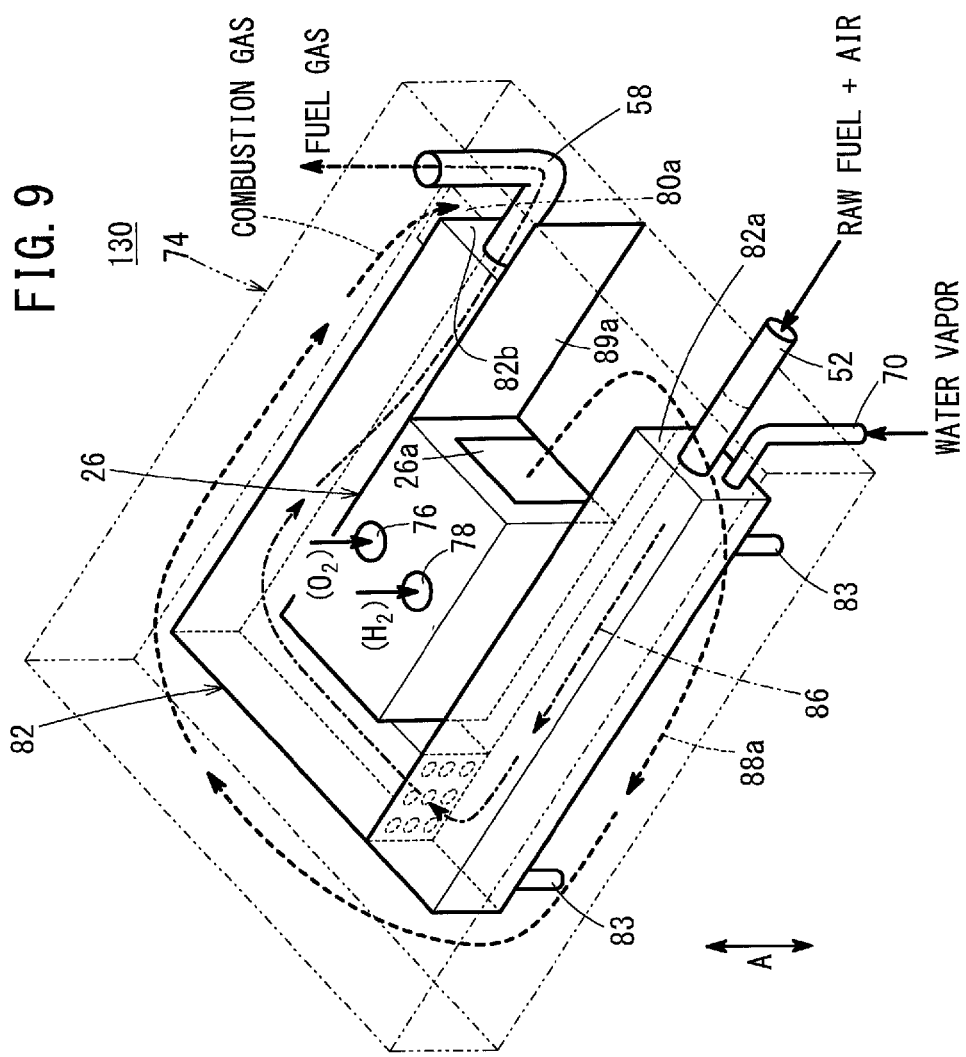
FIG. 9 is a perspective view schematically showing a reformer and an exhaust gas combustor of a fuel cell module according to a fifth embodiment of the present invention.

FIG. 9 is a perspective view schematically showing structure of a reformer 130 of a fuel cell module according to a fifth embodiment of the present invention.

The reformer 130 is provided in the casing 74, and includes a rectangular cylindrical casing 82 around the exhaust gas combustor 26. The casing 74 has an exhaust gas connection window 80a below an end 82b of the rectangular cylindrical casing 82. A partition plate 89a is provided at the end 82b of the rectangular cylindrical casing 82 for isolating an opening 26a from the exhaust gas connection window 80a. The opening 26a and the exhaust gas connection window 80a are adjacent to each other.

Figure 10:
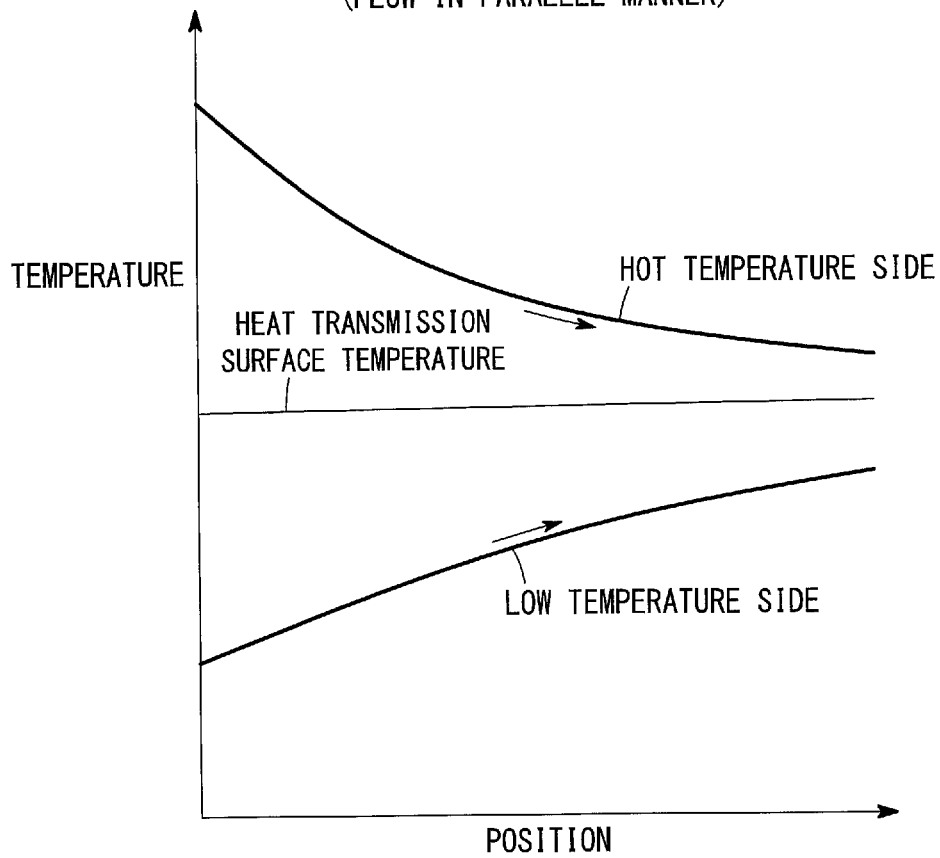
FIG. 10 is a graph showing the relationship in the heat transmission surface temperature when gases flow in a parallel manner.

In the fifth embodiment, the raw fuel flow channel 86 and a combustion gas flow channel 88a are provided adjacent to, and in parallel to each other. The raw fuel in the raw fuel flow channel 86 and the combustion gas in the combustion gas flow channel 88a flow in parallel to each other. In the structure, as shown in FIG. 10, the temperature of the heat transmission surface for the raw fuel and the combustion gas becomes uniform, and the temperature of the raw fuel can be maintained at a certain temperature. The structure adopted in the fifth embodiment is also applicable to any of the first to fourth embodiments.

Figure 11:
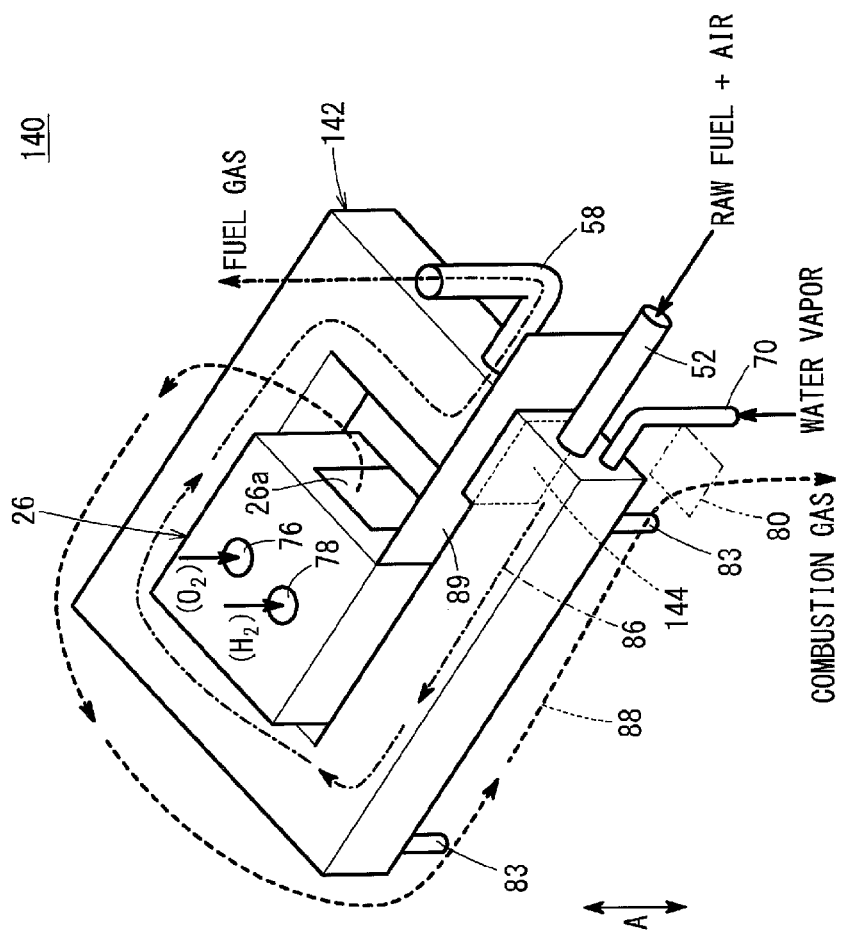
FIG. 11 is a view schematically showing a reformer and an exhaust gas combustor of a fuel cell module according to a sixth embodiment of the present invention.

FIG. 11 is a perspective view schematically showing structure of a reformer 140 of a fuel cell module according to a sixth embodiment of the present invention.

The reformer 140 has, e.g., a rectangular casing 142 as a whole. A raw fuel channel 52 and a water vapor channel 70 are connected to one corner of the casing 142, and the fuel gas channel 58 is connected to the casing 142, at a position adjacent to the raw fuel channel 52 and the water vapor channel 70. A partition plate 144 is provided in the casing 142 for isolating the raw fuel channel 52 and the water vapor channel 70 from the fuel gas channel 58. An exhaust gas combustor 26 is provided in an internal space of the casing 142.

The raw fuel flow channel 86 has a substantially square shape, and the raw fuel flow channel 86 is connected to the raw fuel channel 52 and the fuel gas channel 58. A combustion gas flow channel 88 is provided in an outer area of the reformer 140. The combustion gas flow channel 88 is connected to an exhaust gas combustor 26 and an exhaust gas connection window 80. The combustion gas flows through the combustion gas flow channel 88 along the outer area of the reformer 140. The raw fuel in the raw fuel flow channel 86 and the combustion gas in the combustion gas flow channel 88 flow in a counterflow manner relative to each other. It should be noted that the raw fuel in the raw fuel flow channel 86 and the combustion gas in the combustion gas flow channel 88 may flow in a parallel manner relative to each other.

Figure 12:
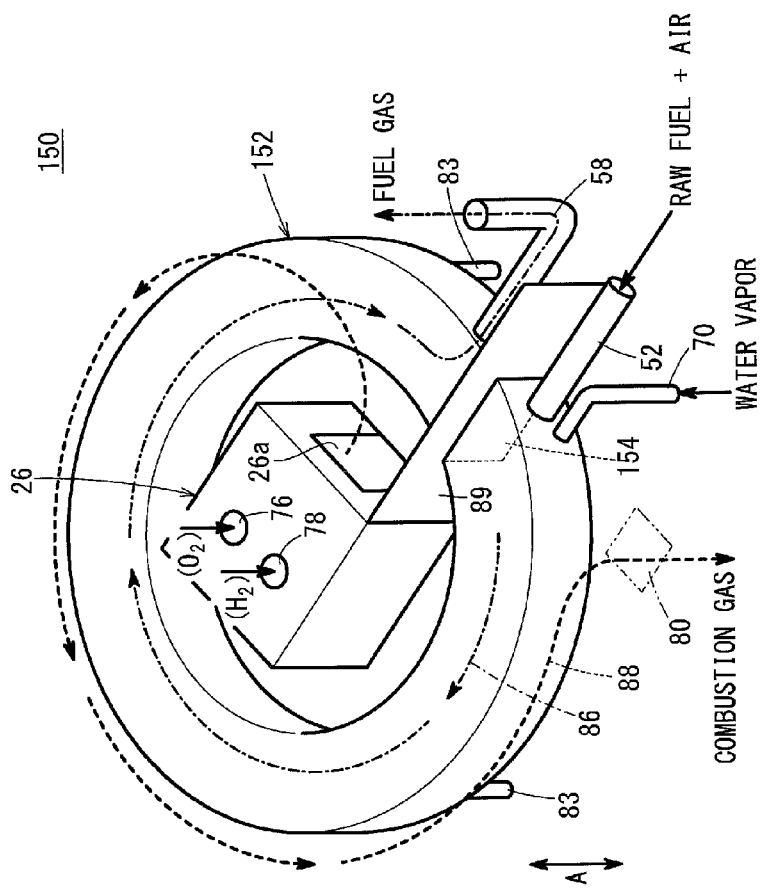
FIG. 12 is a view schematically showing structure of a reformer and an exhaust gas combustor of a fuel cell module according to a seventh embodiment of the present invention.
Figure 13:
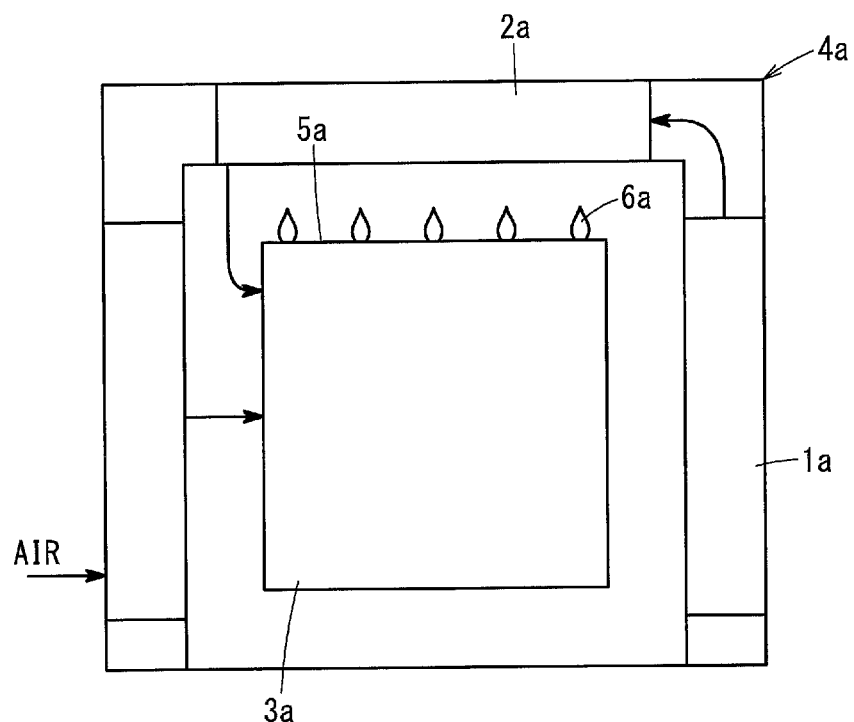
FIG. 13 is a view schematically showing an indirect internal reforming solid oxide fuel cell (SOFC) disclosed in the conventional technique 1.
Figure 14:
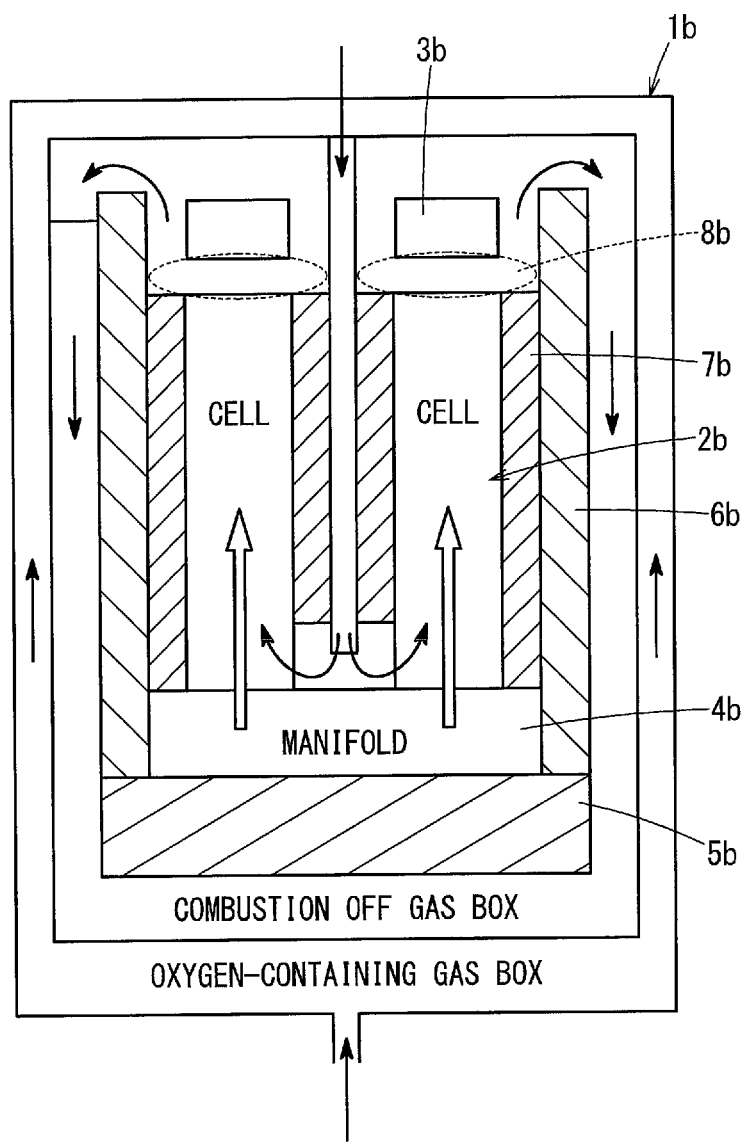
FIG. 14 is a view schematically showing a fuel cell module disclosed in the conventional technique 2.
Figure 15:
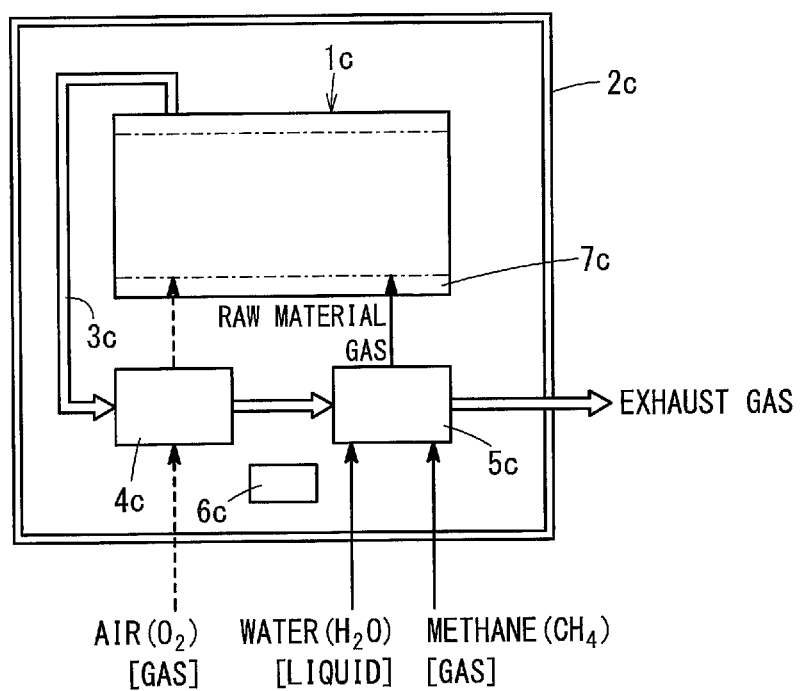
FIG. 15 is a view schematically showing a fuel cell system disclosed in the conventional technique 3.

FIG. 12 is a perspective view schematically showing structure of a reformer 150 of a fuel cell module according to a seventh embodiment of the present invention.

For example, the reformer 150 has a ring-shaped casing 152 as a whole. A raw fuel channel 52 and a water vapor channel 70 are connected to the casing 152. A fuel gas channel 58 is connected to the casing 152 at a position adjacent to the raw fuel channel 52 and the water vapor channel 70. A partition plate 154 is provided for isolating the raw fuel channel 52 and the water vapor channel 70 from the fuel gas channel 58. An exhaust gas combustor 26 is provided in an internal space of the casing 152.

The raw fuel flow channel 86 has a substantially circular shape connected to the raw fuel channel 52 and the fuel gas channel 58. A combustion gas flow channel 88 is provided in an outer area of the reformer 150. The combustion gas flow channel 88 is connected to the exhaust gas combustor 26 and the exhaust gas connection window 80. The combustion gas flows through the combustion gas flow channel 88 along the outer are of the reformer 150. The raw fuel in the raw fuel flow channel 86 and the combustion gas in the combustion gas flow channel 88 flow in a counterflow manner or in a parallel manner relative to each other.

In the sixth and seventh embodiments, the same advantages as in the cases of the first to fifth embodiments are obtained.

While the invention has been particularly shown and described with reference to preferred embodiments, it will be understood that variations and modifications can be effected thereto by those skilled in the art without departing from the scope of the invention as defined by the appended claims.

What is claimed is:

1. A fuel cell module comprising:
a flat plate stack type fuel cell stack formed by stacking a plurality of flat plate type fuel cells configured to perform power generation by electrochemical reactions of a fuel gas and an oxygen-containing gas;
a reformer configured to reform a raw fuel chiefly containing hydrocarbon to produce the fuel gas supplied to the fuel cell stack; and
an exhaust gas combustor configured to combust the fuel gas discharged from the fuel cell stack as a fuel exhaust gas and the oxygen-containing gas discharged from the fuel cell stack as an oxygen-containing exhaust gas to produce a combustion gas, and configured to supply the combustion gas to the reformer,
wherein
the fuel cell stack has an exhaust gas outlet configured to discharge the fuel exhaust gas and the oxygen-containing exhaust gas at one end in a stacking direction of the fuel cells, and the exhaust gas combustor connected to the exhaust gas outlet is provided at the one end of the fuel cell stack in the stacking direction;
the reformer is provided around the exhaust gas combustor and is provided separately from the exhaust gas combustor;
reforming catalyst fills the reformer, and the reformer has a raw fuel flow channel as a passage of the raw fuel;
a combustion gas flow channel connected to the exhaust gas combustor is provided in an outer area of the reformer for allowing the combustion gas to flow along the outer area of the reformer; and
the raw fuel flow channel and the combustion gas flow channel are provided adjacent to and in parallel to each other.

2. The fuel cell module according to claim 1, wherein the raw fuel in the raw fuel flow channel and the combustion gas in the combustion gas flow channel flow in a counterflow manner relative to each other.

3. The fuel cell module according to claim 1, wherein the raw fuel in the raw fuel flow channel and the combustion gas in the combustion gas flow channel flow in a parallel manner relative to each other.

4. The fuel cell module according to claim 1, wherein the reformer includes:
a partial oxidation reformer configured to reform the raw fuel by partial oxidation reaction of the raw fuel and the oxygen-containing gas to produce the fuel gas supplied to the fuel cell stack; and
a steam reformer configured to reform a mixed gas of the raw fuel and water vapor to produce the fuel gas supplied to the fuel cell stack,
wherein the partial oxidation reformer and the steam reformer are connected in series.

5. The fuel cell module according to claim 4, wherein the partial oxidation reformer is provided on a fuel gas channel which is configured to supply the combustion gas to the fuel cell stack, at a position upstream of the steam reformer in a flow direction of the fuel gas.

6. The fuel cell module according to claim 5, further comprising a heat exchanger configured to increase temperature of the oxygen-containing gas by heat exchange with the combustion gas, and configured to supply the oxygen-containing gas to the fuel cell stack; and
the heat exchanger is provided on a side opposite to the fuel cell stack such that the reformer is positioned between the heat exchanger and the fuel cell stack.

7. The fuel cell module according to claim 6, further comprising an evaporator configured to evaporate water to produce water vapor, and configured to supply the water vapor to the steam reformer, and
the evaporator is provided at the one end of the fuel cell stack in the stacking direction, on an exhaust gas channel configured to discharge the combustion gas from the heat exchanger.

8. The fuel cell module according to claim 1, wherein the fuel cell module is a solid oxide fuel cell module.

* * * * *